United States Patent
Weiss et al.

(10) Patent No.: US 10,876,947 B2
(45) Date of Patent: Dec. 29, 2020

(54) OPTICAL PARTICLE SENSOR APPARATUS AND CORRESPONDING PARTICLE MEASUREMENT METHOD

(71) Applicants: Robert Bosch GmbH, Stuttgart (DE); Koninklijke Philips N.V., Eindhoven (NL)

(72) Inventors: Stefan Weiss, Tübingen (DE); Alexander Herrmann, Reutlingen (DE); Robert Wolf, Dresden (DE); Sören Sofke, Tübingen (DE)

(73) Assignees: Robert Bosch GmbH, Stuttgart (DE); TRUMPF PHOTONIC COMPONENTS GMBH, Ulm (DE)

( * ) Notice: Subject to any disclaimer, the term of this patent is extended or adjusted under 35 U.S.C. 154(b) by 0 days.

(21) Appl. No.: 16/514,564

(22) Filed: Jul. 17, 2019

(65) Prior Publication Data
US 2020/0033242 A1    Jan. 30, 2020

(30) Foreign Application Priority Data
Jul. 30, 2018 (DE) .......................... 10 2018 212 685

(51) Int. Cl.
*G01N 15/02* (2006.01)
*G01N 21/49* (2006.01)
(Continued)

(52) U.S. Cl.
CPC ......... *G01N 15/0205* (2013.01); *G01N 21/49* (2013.01); *G01N 2015/1075* (2013.01);
(Continued)

(58) Field of Classification Search
CPC ...... G01N 21/49; G01N 21/53; G01N 15/147; G01N 15/1468; G01N 15/0205;
(Continued)

(56) References Cited

U.S. PATENT DOCUMENTS

| | | | | |
|---|---|---|---|---|
| 4,017,186 A | * | 4/1977 | Shofner | ................. G01N 21/53 356/342 |
| 4,435,093 A | * | 3/1984 | Krause | .................... C10B 45/00 374/129 |

(Continued)

*Primary Examiner* — Sang H Nguyen
(74) *Attorney, Agent, or Firm* — Maginot, Moore & Beck LLP

(57) ABSTRACT

An optical particle sensor apparatus is equipped with a housing (MD) having an optical exit region (OF); an optical emitter device (LD) in the housing that is set up to emit an optical measurement beam (OB) for capturing particles; a focusing lens device (LE) in the housing for directing the optical measurement beam through the optical exit region to outside the housing in a focus region (FA), within which particle capturing is performable; an optical detector device (DD) arranged in the housing and set up to capture the measurement beam (OB') scattered by particles (P) and to output information produced using an algorithm relating to the presence of the particles; and a controllable adaptation device (C, E), which is set up to adapt at least one optical property of the lens device and/or of the optical emitter device and/or of the optical detector device based on an input signal (ES; ES') that provides information relating to a presence and to optical properties of an external optical window (EF) arranged between the optical exit region and the focus region, to capture a particle beyond the external optical window.

18 Claims, 3 Drawing Sheets

(51) Int. Cl.
*G01N 21/39* (2006.01)
*G01N 15/10* (2006.01)
*G01N 15/14* (2006.01)

(52) U.S. Cl.
CPC ............... *G01N 2015/1486* (2013.01); *G01N 2021/399* (2013.01)

(58) Field of Classification Search
CPC ... G01N 2015/0046; G01N 2015/1075; G01N 2015/1486; G01N 2021/399; G01N 2201/0221
See application file for complete search history.

(56) References Cited

U.S. PATENT DOCUMENTS

| | | | | |
|---|---|---|---|---|
| 4,871,251 A * | 10/1989 | Preikschat | ......... | G01N 15/0205 356/336 |
| 5,112,127 A * | 5/1992 | Carrabba | ................. | G01J 3/44 250/227.23 |
| 5,587,785 A * | 12/1996 | Kato | ....................... | G01P 3/366 356/28.5 |
| 5,815,264 A * | 9/1998 | Reed | ...................... | G01N 21/53 250/574 |
| 5,923,035 A * | 7/1999 | Winkler | .................... | G01J 3/10 250/338.5 |
| 5,953,120 A * | 9/1999 | Hencken | ................. | G01N 21/53 356/338 |
| 6,449,042 B1 * | 9/2002 | Hamann | ............. | G01N 15/0211 356/339 |
| 6,476,911 B1 * | 11/2002 | Rose | .................. | G01N 15/0205 356/337 |
| 6,934,037 B2 * | 8/2005 | DePue | .................. | G06F 3/0317 356/498 |
| 7,920,249 B2 * | 4/2011 | Heinks | .................... | G01P 3/366 356/5.09 |
| 8,797,531 B2 * | 8/2014 | Knox | ........ | G01N 15/0205 356/337 |
| 10,359,350 B1 * | 7/2019 | Lin | ..... | G01N 15/0211 |
| 2002/0006731 A1 * | 1/2002 | Nakano | .................. | G01N 21/94 438/710 |
| 2010/0118303 A1 * | 5/2010 | Nagashima | .......... | G08B 17/107 356/337 |
| 2011/0007299 A1 * | 1/2011 | Moench | ................ | G01S 7/4916 356/3 |
| 2015/0077737 A1 * | 3/2015 | Belinsky | .............. | G08B 17/103 356/51 |
| 2018/0209779 A1 * | 7/2018 | Van Der Lee | ........ | G01S 7/4916 |
| 2018/0209892 A1 * | 7/2018 | Van Der Lee | ..... | G01N 15/1434 |

* cited by examiner

OPTICAL PARTICLE SENSOR APPARATUS AND CORRESPONDING PARTICLE MEASUREMENT METHOD

This application claims priority to German Application No. DE 102018212685.2, filed on Jul. 30, 2018. The entire contents of the above-mentioned German patent application is incorporated herein by reference as part of the disclosure of this U.S. application.

The present invention relates to an optical particle sensor apparatus and to a corresponding particle measurement method.

Although the present invention is applicable to any optical particle sensor apparatuses, it and the problems on which it is based will be described in view of optical particle sensor apparatuses that are integrated in mobile apparatuses.

Prior Art

DE 10 2015 207 289 A1 discloses an optical particle sensor apparatus having a VCSEL laser diode with integrated photodiode. A VCSEL laser diode (VCSEL=vertical-cavity surface-emitting laser) is a light-emitting diode in which the light is emitted perpendicularly to the plane of the semiconductor chip. Using the self-mixing-interference technique, the known optical particle sensor apparatus makes it possible to obtain information relating to a presence of particles, in particular the number of particles and the particle velocity.

FIG. 5 is a block diagram for describing an optical particle sensor apparatus known from DE 10 2015 207 289 A1.

In FIG. 5, reference sign 50a designates an optical emitter device and 50b designates an optical detector device, wherein the optical emitter device 50a is a VCSEL laser and the optical detector device 50b is a photodiode. The optical emitter device 50a and the optical detector device 50b are integrated in a VCSEL sensor chip 66, in which a self-mixing-interference analysis function is integrated. The optical emitter device 50a emits an optical measurement beam 52. The optical measurement beam 52 is focused using a lens device 58 in a focus region 60 in which the particles 56 are to be captured.

The measurement beam 62 that is scattered by the particles is focused by the lens device 58 onto a detecting surface 64 of the VCSEL sensor chip 66. An optional mirror device 74 makes it possible to displace the focus region 60 one-dimensionally or two-dimensionally within the focus region 60.

The optical detector device 50b is embodied to output an information signal 68 relating to an intensity and/or an intensity distribution of the scattered electromagnetic measurement beam 62 that is incident on the detecting surface 64. An evaluation device 70 provides an information signal 72 relating to a presence of the particles 56, a number of particles and/or any other property of the particles 56. In particular, the particle velocity is also of interest.

EP 3 023 767 A1 discloses an interferometer apparatus for determining optical properties of an optically transparent medium that is arranged in front of it.

U.S. Pat. No. 8,369,584 B2 discloses a method and an apparatus for retinal identification using a liquid lens in a mobile apparatus, such as a smartphone. Such liquid lenses consist for example of a chamber having two different non-mixing liquids that have different refractive indices and electrical properties. The focal length of the liquid lens is variable using electric voltage.

US 2016/0025628 A1 discloses a smartphone having an integrated optical particle sensor apparatus.

DISCLOSURE OF THE INVENTION

The present invention provides an optical particle sensor apparatus and a corresponding particle measurement method.

Advantages of the Invention

The idea on which the present invention is based involves providing an optical particle sensor apparatus that does not require a measurement cell having openings through which a flow of air is to be transported to perform particle capturing.

The invention uses a focused coherent measurement beam, in particular a laser beam, by way of which the particle velocity and the number of particles are measured. The natural airflow in an open environment is utilized for the measurements, wherein the measurements are performed from an open housing or from a closed housing through an optical window.

If the housing has an optical window, the optical window is designed such that the influence thereof on the optical properties of the measurement beam are as low as possible. The invention additionally makes it possible to perform measurements if a further optical window is arranged between the exit region or between the optical window of the housing and the desired focus region in that a controllable adaptation device is provided that is set up to adapt at least one optical property of the lens device and/or of the optical emitter device and/or of the optical detector device based on an input signal that can provide information relating to a presence and relating to optical properties of such an external optical window.

For example, the optical particle sensor apparatus according to the invention makes particle measurements from the interior of a vehicle or a house in the external region possible.

According to a preferred embodiment, a transparent optical housing window is placed in the optical exit region. Said window ensures protection for the sensitive optical unit.

According to a further preferred embodiment, the adaptation device has an input device for manually inputting information relating to the presence and relating to the optical properties of the external optical window, and a control device for adapting the at least one optical property of the lens device and/or the optical emitter device and/or the optical detector device on the basis of one or more previously input criteria. In this way, the user can input the exact specification.

According to a further preferred embodiment, the adaptation device has a sensor device for capturing and automatically inputting information relating to the optical properties of the external optical window, and a control device for adapting the at least one property of the lens device and/or the optical emitter device and/or the optical detector device on the basis of one or more previously input criteria. In this way, the specification can be specified automatically.

According to a further preferred embodiment, the sensor device comprises an interferometer device for determining the optical properties of the external optical window. Such an interferometer device is easy to integrate.

According to a further preferred embodiment, adapting the at least one optical property of the lens device and/or the optical emitter device and/or the optical detector device comprises adapting a focal length of the lens device.

According to a further preferred embodiment, the lens device is a liquid lens having a variable focal length that is controllable via the control device. It represents effective adaptation.

According to a further preferred embodiment, the focal length is variable in a region between 1 cm and 50 cm. It is thus possible to cover a highly practice-relevant region.

According to a further preferred embodiment, adapting the at least one property of the lens device and/or of the optical emitter device and/or of the optical detector device comprises adapting an optical output power of the optical emitter device. This parameter is precisely settable.

According to a further preferred embodiment, adapting the at least one property of the lens device and/or the optical emitter device and/or the optical detector device comprises adapting the sensitivity of the optical detector device.

According to a further preferred embodiment, the controllable adaptation device is additionally set up to adapt the algorithm, in particular a threshold value of particle capturing that is used. This additionally increases the flexibility.

According to a further preferred embodiment, the optical emitter device includes a laser diode, in particular a VCSEL diode, and the optical detector device includes a photodiode that is integrated in the laser diode. Such a VCSEL chip is integratable in a space-saving manner.

According to a further preferred embodiment, the measurement beam and the scattered measurement beam are able to be analysed by way of the algorithm using the self-mixing-interference method.

According to a further preferred embodiment, the optical particle sensor apparatus is arranged in a portable apparatus, in particular in a smartphone. Consequently, the particle sensor apparatus is versatile.

BRIEF DESCRIPTION OF THE DRAWINGS

In the figures.

Identical or functionally identical elements are denoted in the figures with the same reference signs.

DESCRIPTION OF THE EXEMPLARY EMBODIMENTS

Figure 1:
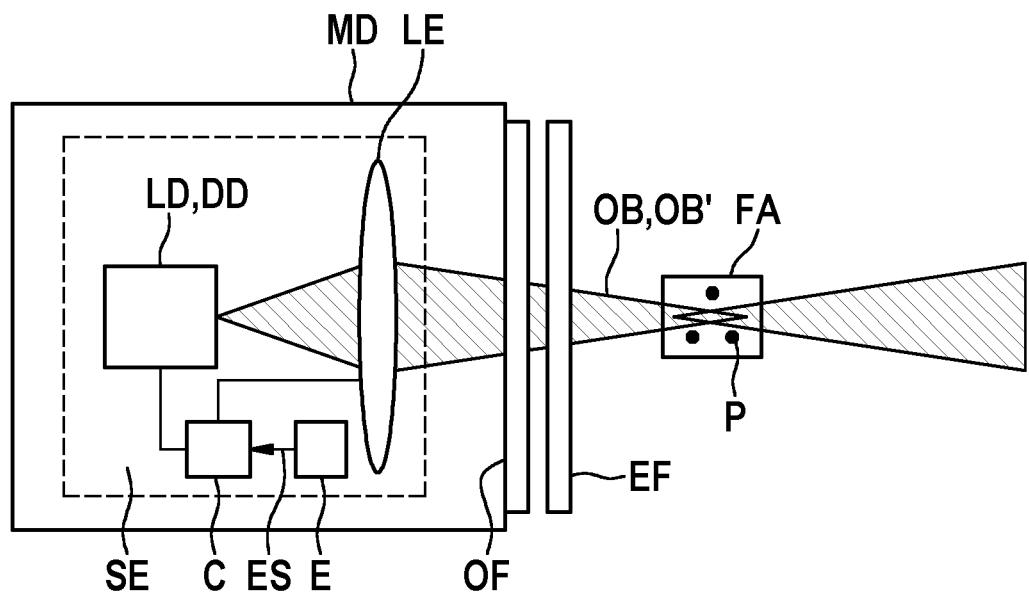
FIG. 1 shows a block diagram for describing an optical particle sensor apparatus according to a first embodiment of the present invention.

FIG. 1 shows a block diagram for describing an optical particle sensor apparatus according to a first embodiment of the present invention.

In FIG. 1, reference sign MD designates a housing of the optical particle sensor apparatus SE according to the first embodiment, wherein the housing MD has an optical exit region OF in which a transparent optical housing window OF is placed in the present example, although this is not absolutely necessary.

The optical particle sensor apparatus SE can be integrated for example in a smartphone or can form an independent device that can be carried along by the user in a portable fashion although it can also be attached in a fixed position, for example to the inside of a window of a vehicle or building.

Figure 5:
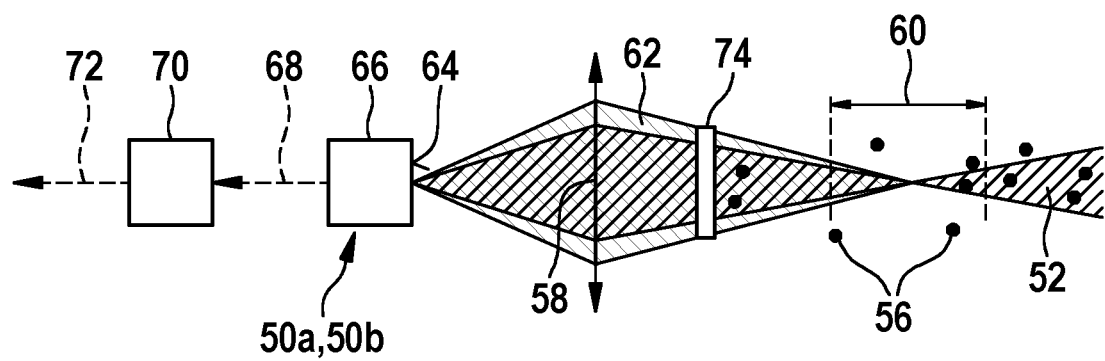
FIG. 5 shows a block diagram for describing an optical particle sensor apparatus known from DE 10 2015 207 289 A1.

An optical emitter device LD and an optical detector device DD, which in the present case are integrated on a common VCSEL sensor chip in the form of a laser diode and a photodiode, as already explained in the introductory part with reference to FIG. 5, are arranged in the housing MD.

Furthermore arranged in the housing MD is a focusing lens device LE for directing an optical measurement beam OB emitted by the optical emitter device LD for particle capturing through the optical exit region OF outside the housing MD in a focus region FA, within which particle capturing is performable.

The focusing lens device LE directs the measurement beam OB' that was scattered by particles P in the focus region FA onto the optical detector device DD which is embodied to output information relating to the presence of the particles P produced using an algorithm. Said information comprises in particular the number of particles and the particle velocity.

The optical particle sensor apparatus SE furthermore includes a controllable adaptation device C, E, which is set up to adapt at least one optical property of the lens device LE and/or the optical detector device DD based on an input signal ES that provides information relating to a presence and relating to optical properties of an external optical window EF arranged between the optical exit region OF and the focus region FA, such that particle capturing beyond the external optical window EF is possible.

In the first embodiment, the external optical window EF is, for example, a vehicle window or a building window through which particle capturing is to be effected toward the outside.

In the first embodiment it is assumed that the external optical window EF has known optical properties. To take into account the external optical window EF, the controllable adaptation device C, E includes an input device E for manually inputting information relating to the presence and relating to the optical properties of the external optical window EF. For example, it is possible to input the window type and window thickness etc. via the input device. The input signal ES is fed to a control device C associated with the adaptation device C, E, wherein the control device C is set up to adapt the at least one optical property of the lens device LE and/or of the optical emitter device LD and/or of the optical detector device DD on the basis of one or more previously input stored criteria.

In the present example it is assumed that a corresponding table is stored in the control device C, which table prompts a corresponding adaptation depending on the glass type and glass thickness. Said adaptation can comprise for example increasing the output power of the optical emitter device LD so as to ensure that the focus region FA is located in the desired region beyond the external optical window EF. Furthermore, adapting can comprise changing a focal length of the lens device LE and increasing the sensitivity of the optical detector device DD.

To change the focal length of the lens device LE, the lens device LE can be for example a liquid lens having a variable focal length that is electrically controllable by way of the control device C. Depending on the window type and window thickness, the focal length can be variable for example in a region between 1 cm and 50 cm.

An additional option for adaptation involves for example adapting the algorithm for particle capturing, in particular adapting a threshold value of particle capturing that is used.

Figure 2:
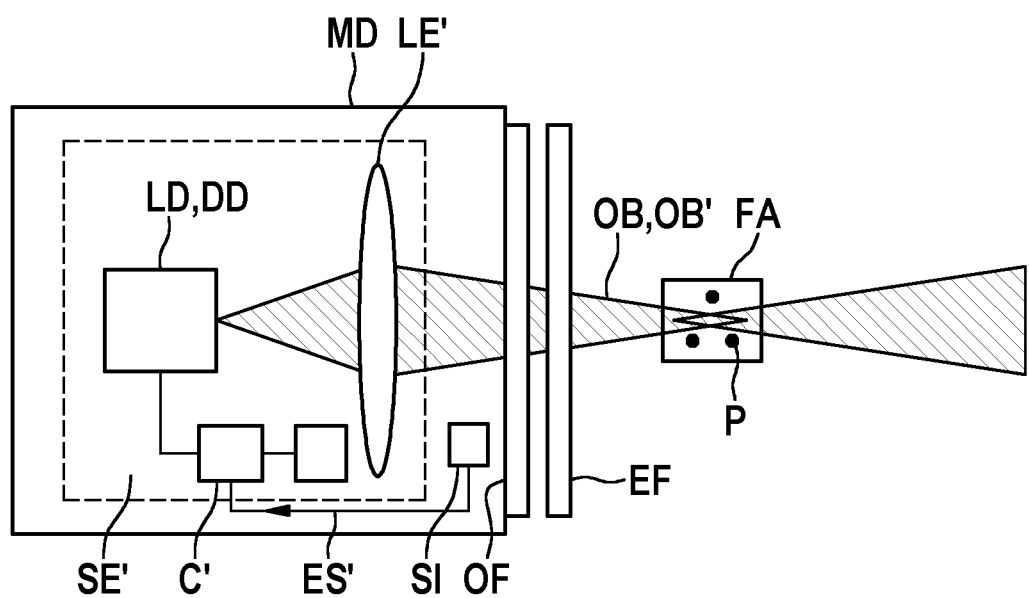
FIG. 2 shows a block diagram for describing an optical particle sensor apparatus according to a second embodiment of the present invention.

FIG. 2 shows a block diagram for describing an optical particle sensor apparatus according to a second embodiment of the present invention.

In the second embodiment, the optical particle sensor apparatus is denoted by the reference sign SE'.

In contrast to the first embodiment, the focusing lens device LE' in the second embodiment is not adaptable but has a fixed specified focal length.

Furthermore, the adaptation device C'. SI in the second embodiment has a sensor device SI for capturing and automatically inputting the information relating to the optical properties of the external optical window EF. The corresponding input signal ES' is fed to a control device C' that is set up to adapt the at least one property of the optical emitter device LD and/or of the optical detector device DD on the basis of the one or the plurality of previously input criteria. In other words, automatic adaptation without manual input by the user takes place in the second embodiment.

The sensor device SI used is, for example, an interferometer device for determining the optical properties of the external optical window EF using interference measurements.

As for the rest, the second embodiment is analogous to the above-described first embodiment.

Figure 3:
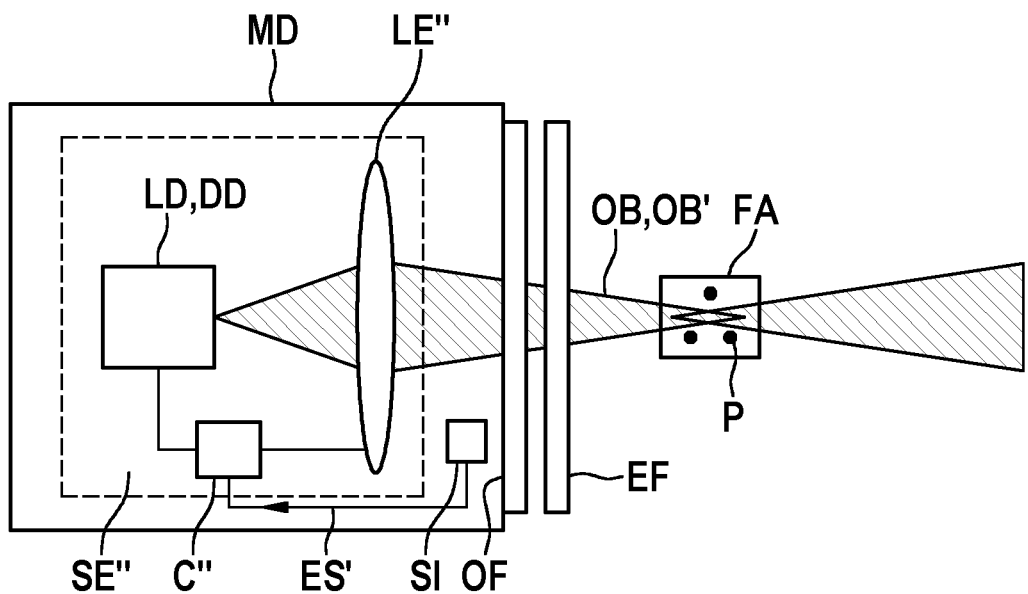
FIG. 3 shows a block diagram for describing an optical particle sensor apparatus according to a third embodiment of the present invention.

FIG. 3 shows a block diagram for describing an optical particle sensor apparatus according to a third embodiment of the present invention.

In the third embodiment, the optical particle sensor apparatus is denoted by the reference sign SE".

In contrast to the above-described second embodiment, the focusing lens device LE" is adaptable as in the above-described first embodiment, which means that the control device C" can perform, on the basis of the input signal ES', adaptation of the focus region of the focusing lens device LE" and of the optical output power of the optical emitter device LD and/or adaptation of the sensitivity of the optical detector device DD.

It is expedient both in the second embodiment and in the first embodiment if capturing is performed by the sensor device SI cyclically, such that it is possible to perform dynamic adaptation of the properties of the optical sensor apparatus SI', SI" and consequently to take into account the change in a measurement position of the user.

Figure 4:
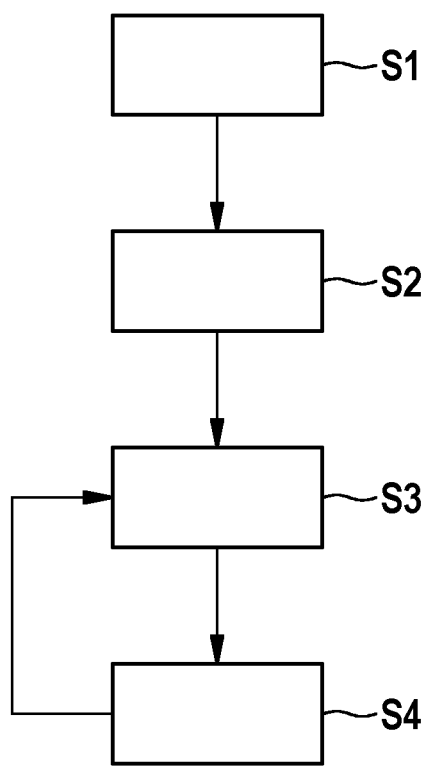
FIG. 4 shows a block diagram for describing an optical particle sensor apparatus according to a fourth embodiment of the present invention.

FIG. 4 shows a block diagram for describing a particle measurement method according to a fourth embodiment of the present invention.

According to FIG. 4, the particle sensor apparatus is arranged in a measurement position in step S1.

If an external optical window EF is present between the housing-internal optical window OF and a desired focus region FA, in step S2, adaptation is effected of at least one property of the lens device LE and/or of the optical emitter device LD and/or of the optical detector device DD and additionally of the algorithm based on the input signal ES or ES' that is input manually or automatically.

In step S3, pulsed or continuous capturing of the particles P is then performed.

In step S4, further adaptation can take place, for example, which takes into account that for example the measurement position has changed in the meantime, after which the method jumps back to step S3.

The steps S3 and S4 can thereafter be repeated cyclically as often as desired.

Although the present invention was described in its entirety above with reference to preferred exemplary embodiments, it is not limited thereto, but is modifiable in a variety of ways.

Although the optical particle sensor apparatus in the above embodiments is integrated in a mobile apparatus, such as a smartphone, it is also possible for the optical particle sensor apparatus to be provided as a stationary apparatus that is adhesively bonded for example to a vehicle window or a building window.

The number of the windows shown and of the lens elements is not limited to the above exemplary embodiments either, but is variable as desired. In particular, a plurality of focusing lens devices and a plurality of external windows, for example a multilayer window, can be provided. Furthermore it is possible to use a plurality of measurement beams rather than a single measurement beam.

The invention claimed is:

1. Optical particle sensor apparatus, comprising:
a housing having an optical exit region;
an optical emitter device arranged in the housing and configured and operable to emit at least one optical measurement beam for capturing particles;
a focusing lens device arranged in the housing for directing the optical measurement beam through the optical exit region to outside the housing in a focus region, within which particle capturing is performable;
an optical detector device arranged in the housing and configured and operable to capture the measurement beam scattered by particles and to output information produced using an algorithm relating to the presence of the particles; and
a controllable adaptation device, configured and operable to adapt at least one optical property of one or more of the lens device, the optical emitter device, and the optical detector device, based on an input signal that provides information relating to a presence of and optical properties of an external optical window arranged between the optical exit region and the focus region, such that particle capturing beyond the external optical window is performable.

2. Optical particle sensor apparatus according to claim 1, wherein a transparent optical housing window is placed in the optical exit region.

3. Optical particle sensor apparatus according to claim 1, wherein the adaptation device has an input device for manually inputting information relating to the presence of and the optical properties of the external optical window, and a control device for adapting the at least one optical property of one or more of the lens device, the optical emitter device, and the optical detector device on the basis of one or more previously input criteria.

4. Optical particle sensor apparatus according to claim 1, wherein the adaptation device has a sensor device for capturing and automatically inputting the information relating to the optical properties of the external optical window, and a control device for adapting the at least one property of one or more of the lens device, the optical emitter device, and the optical detector device on the basis of one or more previously input criteria.

5. Optical particle sensor apparatus according to claim 4, wherein the sensor device comprises an interferometer device for determining the optical properties of the external optical window.

6. Optical particle sensor apparatus according claim 1, wherein adapting the at least one optical property of one or more of the lens device, the optical emitter device, and the optical detector device comprises the controllable adaptation device configured and operable to adapt a focal length of the lens device.

7. Optical particle sensor apparatus according to claim 6, wherein the lens device includes a liquid lens having a variable focal length that is controllable by way of the control device.

8. Optical particle sensor apparatus according to claim 7, wherein the focal length is variable in a region between 1 cm and 50 cm.

9. Optical particle sensor apparatus according claim 1, wherein adapting the at least one property of one or more of the lens device, the optical emitter device, and the optical detector device comprises the controllable adaptation device configured and operable to adapt an optical output power of the optical emitter device.

10. Optical particle sensor apparatus according claim 1, wherein adapting the at least one property of one or more of the lens device, the optical emitter device, and the optical detector device comprises the controllable adaptation device configured and operable to adapt the sensitivity of the optical detector device.

11. Optical particle sensor apparatus according claim 1, wherein the controllable adaptation device is additionally configured and operable to adapt the algorithm, to a threshold value of particle.

12. Optical particle sensor apparatus according claim 1, wherein the optical emitter device includes a laser diode and the optical detector device includes a photodiode that is integrated in the laser diode.

13. Optical particle sensor apparatus according claim 1, wherein the algorithm is configured to analyze the measurement beam and the scattered measurement beam using the self-mixing-interference method.

14. Optical particle sensor apparatus according claim 1, integrated into a smartphone.

15. A particle measurement method using an optical particle sensor apparatus according to claim 1 having the steps of:
arranging the particle sensor apparatus in a measurement position, wherein the external optical window is arranged between the housing-internal optical window and a desired focus region; and
adapting at least one property of one or more of the lens device of the optical emitter device, and of the optical detector device, based on an input signal that provides information relating to optical properties of the external optical window arranged between the housing-internal optical window and the focus region.

16. Particle measurement method according to claim 15, wherein adapting comprises adapting a focal length of the lens device and/or adapting an optical output power of the optical emitter device and/or adapting the algorithm, in particular a threshold value of particle capturing that is used.

17. Particle measurement method according to claim 15, wherein the algorithm is adapted to a threshold value of particle capturing that is used.

18. Particle measurement method according to claim 15, wherein adapting is repeated cyclically.

* * * * *